(12) United States Patent
Moffitt et al.

(10) Patent No.: US 7,513,750 B2
(45) Date of Patent: Apr. 7, 2009

(54) ROTOR BLADE TIP PLANFORM

(75) Inventors: Robert C. Moffitt, Seymour, CT (US); Thomas Alan Egolf, Glastonbury, CT (US); Robert D. Beatty, Trumbull, CT (US); John K. Karpowich, Trumbull, CT (US); Ashish Bagai, Hamden, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 398 days.

(21) Appl. No.: 11/370,407

(22) Filed: Mar. 8, 2006

(65) Prior Publication Data

US 2007/0212223 A1    Sep. 13, 2007

(51) Int. Cl.
*B64C 27/46* (2006.01)

(52) U.S. Cl. ..................................... 416/228

(58) Field of Classification Search ............... 416/226, 416/228, 238
See application file for complete search history.

(56) References Cited

U.S. PATENT DOCUMENTS

| | | | |
|---|---|---|---|
| 3,822,105 A * | 7/1974 | Jepson | 416/223 R |
| 4,248,572 A * | 2/1981 | Fradenburgh | 416/228 |
| 4,324,530 A | 4/1982 | Fradenburgh et al. | |
| 4,334,828 A | 6/1982 | Moffitt | |
| 4,451,206 A * | 5/1984 | Philippe et al. | 416/228 |
| 4,880,355 A * | 11/1989 | Vuillet et al. | 416/228 |
| 5,137,427 A * | 8/1992 | Shenoy | 416/223 R |
| 5,199,851 A * | 4/1993 | Perry et al. | 416/223 R |
| 6,364,615 B1 * | 4/2002 | Toulmay et al. | 416/223 R |

* cited by examiner

*Primary Examiner*—Edward Look
*Assistant Examiner*—Nathaniel Wiehe
(74) *Attorney, Agent, or Firm*—Carlson, Gaskey & Olds PC

(57) ABSTRACT

A main rotor blade incorporating a rotor blade tip region having a tip chord and a tip taper such that the ratio of the main rotor blade chord to the tip chord is approximately 0.30. The tip taper ratio preferably providing an approximately 28% area of reduction in said outer 10% of said blade span. The tip region preferably further including a hover optimized high lift airfoil and a tip sweep that reaches a constant value of approximately 30 degrees along the quarter chord line.

12 Claims, 6 Drawing Sheets

ROTOR BLADE TIP PLANFORM

BACKGROUND OF THE INVENTION

The present application is directed to a main rotor blade tip design for rotary-wing aircraft and more particularly to a main rotor blade tip planform that enhances hover performance by the combined tailoring of blade tip sweep, blade tip taper and blade tip anhedral.

In general, airfoils have a limited range of Mach numbers and angles of incidence with respect to the relative wind over which they operate efficiently. In general, it may be claimed that the efficiency of a hovering rotor will continue to improve as rotor thrust, and simultaneously, airfoil lift continues to increase. However, once the tip airfoil maximum lift coefficient is approached at its operating Mach number, the drag of the tip airfoil increases rapidly, and the hovering efficiency of the rotor system accordingly drops. Typically, an airfoil operating at a higher Mach number will stall sooner than one operating at lower Mach numbers. Because the tip of the hovering rotor blade is operating at the highest Mach number, it will be the first to experience the onset of stall and, therefore, an increase in drag, resulting in a drop off in rotor hovering efficiency.

The maximum lift of a rotor blade in hover can be extended and higher hover efficiencies reached by improving the maximum lift coefficient of the tip airfoil at hover critical Mach numbers typically in the rage of approximately 0.5 to approximately 0.6. However, the use of high lift airfoils over the tip region of rotor blades is of minimal use if the rotor blade forward flight performance efficiency becomes resultantly restricted as a consequence of advancing and retreating side airfoil requirements that differ from hover requirements.

For conventional rotor blade designs, the maximum lift that can be efficiently obtained in hover is already relatively well matched with the gross weight that can be carried efficiently in forward flight. That is, the hover efficiency (Figure of Merit) is optimized at an aircraft maximum gross weight which is already generally equivalent to the aircraft maximum gross weight during forward flight operations.

Increasing operational lift levels in both hover and forward flight may be achieved with improved airfoil geometry design alone. To do so, the airfoil must increase lift at hover critical tip Mach numbers of 0.5 and 0.6, as well as provide an increase in airfoil lift at the forward flight retreating side critical Mach numbers of 0.3 and 0.4. Simultaneously, adverse Mach related drag divergence impact must be avoided as the airfoil experiences Mach numbers above 0.8 on the advancing side of the rotor disk. While current computer based airfoil design codes are capable of assisting in the development of optimized blade designs, the design of a multitude of airfoils distributed along the rotor blade span that meet the required lift, drag and pitching moment operational and performance criteria in hover and forward flight is very difficult.

The approach to proper rotor blade tip design is to carefully combine various blade tip geometric attributes and airfoils to provide the best hover and forward flight performance gains to be realized. In other words, performance shortfalls that may occur in forward flight as a result of using hover optimized airfoils for improved hover efficiency may be resolved by carefully altering other blade geometric parameters so as to simultaneously improve forward flight efficiency.

SUMMARY OF THE INVENTION

A main rotor blade according to the present invention includes a rotor blade that encompasses the use of airfoils with improved lift and drag characteristics at hover critical Mach numbers, along with tip planform designs that improve hover efficiency at lift levels that avoid conflict with a maximum gross weight required for efficient forward flight operation. The applicants have determined that the rate of blade tip chord taper controls the gross weight (thrust) at which hover efficiency improvements occur when hover optimized high lift airfoils are utilized in the blade tip region. The hover lift level at which the hover efficiency gain occurs is tuned to match the rotor forward flight lift capability. Increased tip taper lowers the hover thrust at which the efficiency improvement is seen, and decreased taper increases the corresponding thrust.

The rotor blade tip planform is utilized in combination with tip sweep and tip anhedral to obtain maximum benefit. Tip sweep matches the tip airfoil Mach number in hover to the Mach number at which airfoil maximum lift is tailored. Anhedral is utilized to reduce induced hover losses and further increase hover efficiency. Increased tip taper reduces anhedral related power penalties in forward flight.

The present invention therefore provides a rotor blade tip planform which may be used in combination with a hover optimized high lift tip airfoil section so that the resulting combination increases the hover efficiency while not only avoiding conflict with the gross weight of efficient forward flight operations, but rather, helps improve it.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
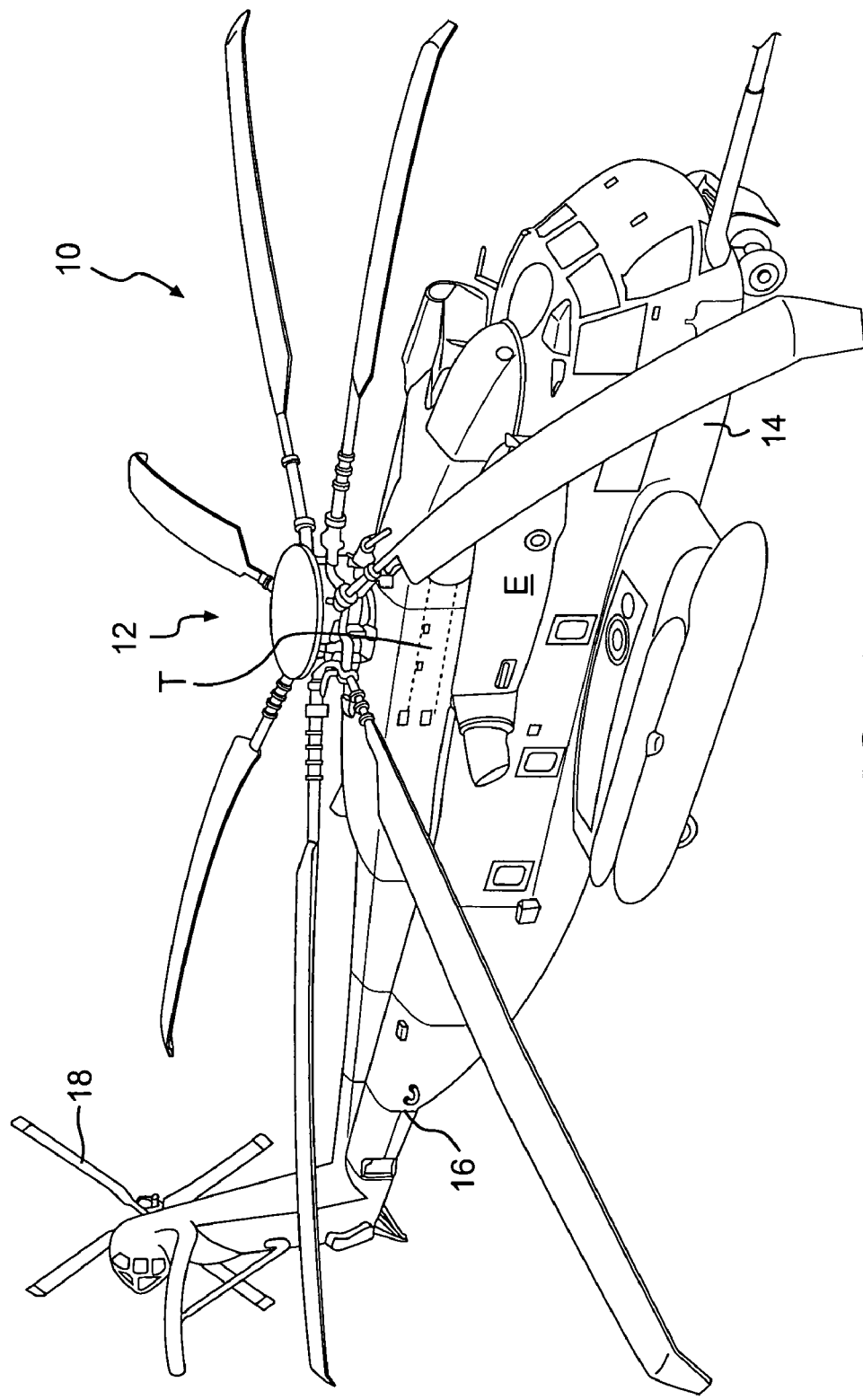
FIG. 1 is a general schematic view of an exemplary rotary wing aircraft having a single rotor system which may incorporate a tip planform designed according to the present invention.

FIG. 1 schematically illustrates a rotary-wing aircraft 10 having a main rotor assembly 12. The aircraft 10 includes an airframe 14 having an extending tail 16 which mounts an anti-torque rotor 18. The main rotor assembly 12 is driven through a transmission (illustrated schematically at T) by one or more engines E. The present invention may be embodied for use with rotor assemblies of other helicopters, high speed coaxial counter-rotating aircraft with translational thrust systems, turbo-props, tilt-rotor aircraft and other such aircraft. It should be understood that a Sikorsky CH-53 type helicopter configuration as illustrated in the disclosed embodiment is for discussion purposes only.

Figure 2:
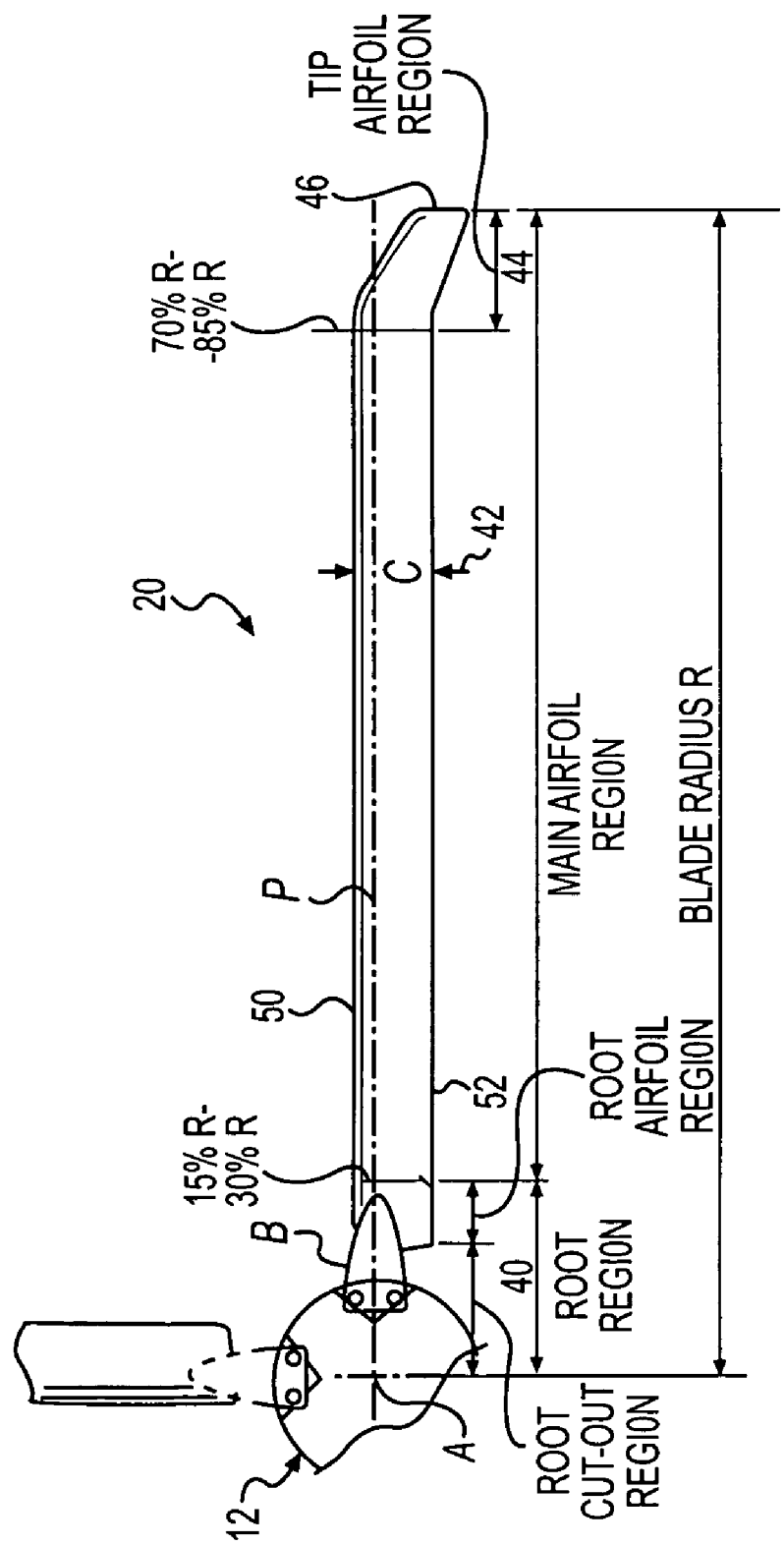
FIG. 2 is a plan view of a main rotor blade designed according to the present invention.

FIG. 2 illustrates a general exemplary plan view of a main rotor blade 20. The rotor blade 20 can generally be divided into a root region 40, a main region 42, and a tip region 44. The root, main, and tip regions 40, 42, 44 define the span of the rotor blade 20 and define a blade radius R between the axis of rotation A and a distal tip end 46 of the blade tip region 44. The rotor blade 20 defines a leading edge 50 and a trailing edge 52, which define the chord C of the rotor blade 20. A pitching or feathering axis P is the axis about which aerodynamic blade twist primarily occurs.

The blade region extending inboard of approximately 30% R, and preferably inboard of 15% R defines the root region 40 that includes the blade to hub attachment system (schematically illustrated). Notably, the rotor blade 20 is mounted within the root region 40 along a length typically referred to as a root cut-out region. The root cut-out region has comparatively minimal aerodynamic significance since it is typically at least partially enclosed within a blade cuff B (illustrated schematically). The blade cuff B mounts the rotor blade 20 to the rotor assembly 12 as generally understood such that further detailed discussion need not be provided herein. The main region 42 of the blade 20 is the primary aerodynamic portion of the blade 20 inclusive of the tip region 44. The tip region 44 is preferably the outboard 15% R to 30% R of the rotor blade 20. It should be understood that the blade is illustrated somewhat schematically and that various chord distributions along the blade span will also be usable with the present invention.

The blade tip region 44 typically encompasses approximately 70% R-100% R to 85% R-100% R of the rotor blade 20. The tip region 44 may be defined by several design characteristics that differentiate it from the main region 42, such as, for example, a transition to transonic airfoils, changes in twist and the incorporation of other geometric characteristics such as sweep, taper, dihedral, and anhedral. It should also be understood that a multitude of airfoil sections may be utilized in any or all of the rotor blade regions as defined herein. The inventive tip planform designed according to the present invention may be applied over the tip region 44 of the blade.

Figure 3A:
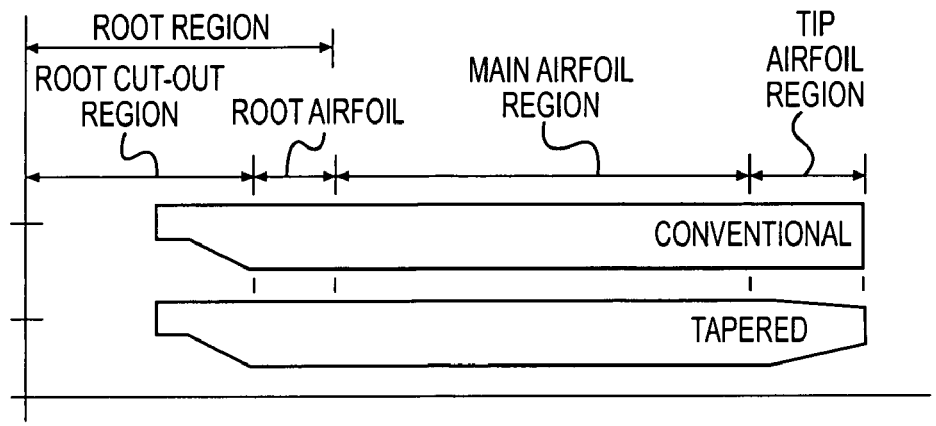
FIG. 3A is a plan view of an exemplary conventional rotor blade as compared to an exemplary tapered rotor blade.
Figure 3B:
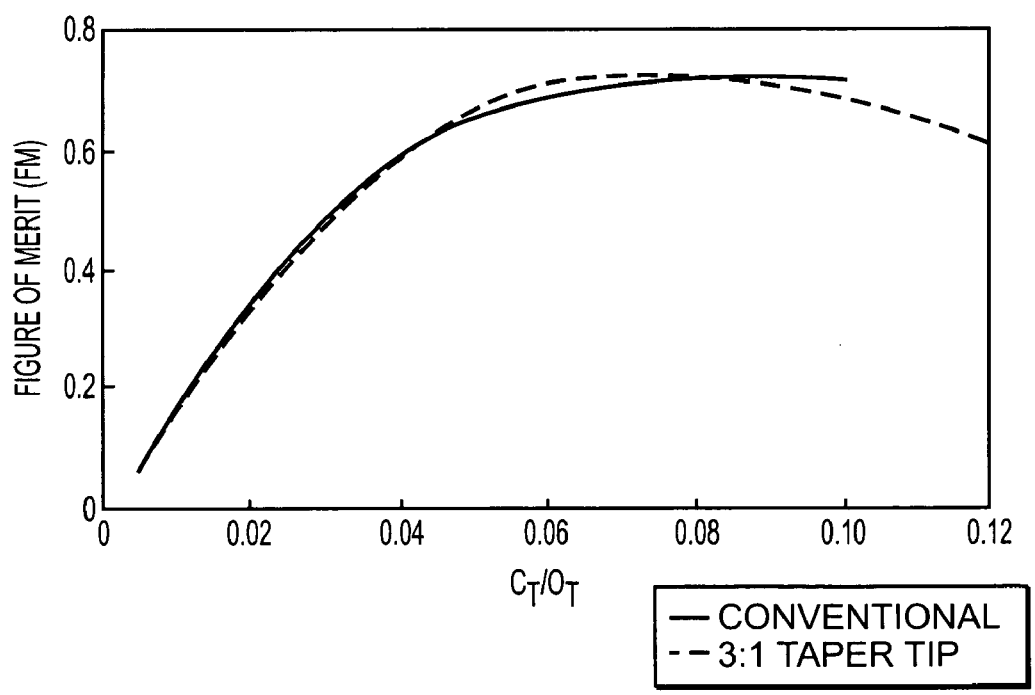
FIG. 3B is a graph illustrating the use of taper to shift the location of the rotor lift at which maximum efficiency is obtained for the exemplary rotor blades illustrated in FIG. 3A.

Referring to FIGS. 3A and 3B, the effect of tip taper in controlling the rotor lift value at maximum hover efficiency is illustrated by two exemplary rotor blade tip planforms (FIG. 3A) and their associated hover efficiency (Figure of Merit; FIG. 3B) as determined in test by the Applicant. Other than change in tip taper, the two rotor blades are equivalent. As illustrated in FIG. 3B, testing determined that peak hover efficiency levels (Figure of Merit) are similar with the exception that the maximum efficiency on the main rotor blade incorporating the tapered tip occurs at a lower lift value (x-axis; $C_T/\sigma_T$). This demonstrates that tip taper shifts the location of the occurrence of maximum efficiency to lower values of rotor lift. This shift occurs because tip taper decreases tip drag at low lift by limiting tip area, but increases tip drag at high lift because the tapered tip encounters early stall.

Figure 4:
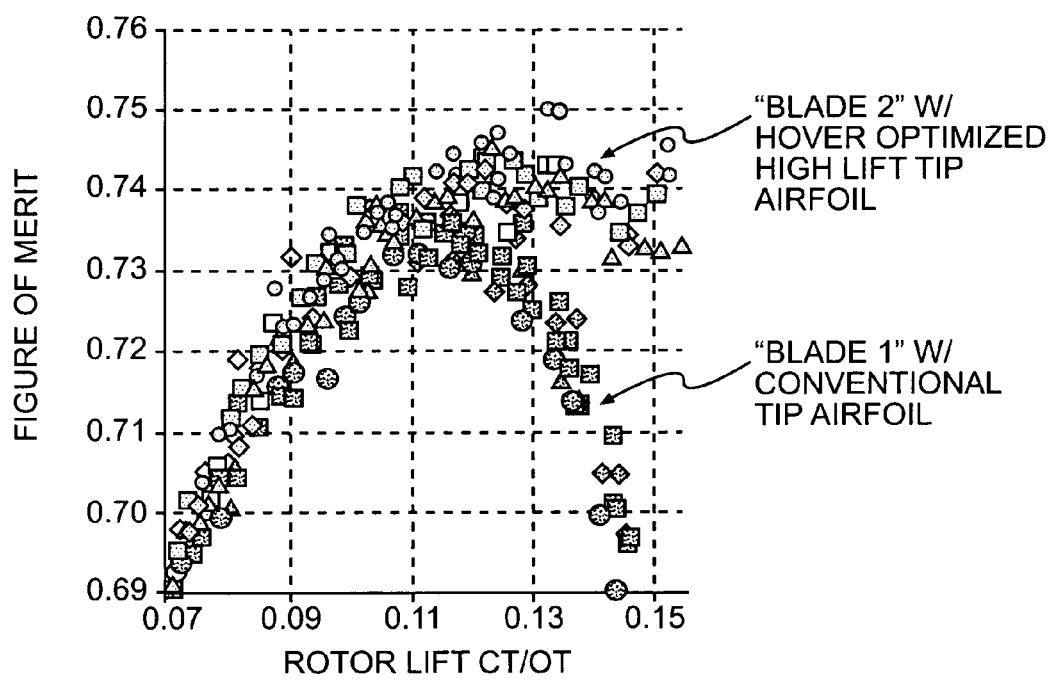
FIG. 4 is a comparison of the hovering efficiency, Figure of Merit (FM) versus rotor lift for a rotor blade with a conventional tip airfoil as compared to a rotor blade with a hover optimized high lift tip airfoil.

A comparison of Figure of Merit levels in hover for two rotors with identical planforms, but different tip airfoils is illustrated in FIG. 4 as obtained by test by the Applicant. The tip region of "Rotor Blade 2" incorporates a hover optimized high lift airfoil section such as the airfoil disclosed in U.S. patent application Ser. No. 11/356,406 entitled "AN AIRFOIL FOR A HELICOPTER ROTOR BLADE," which is assigned to the assignee of the instant invention and which is hereby incorporated herein in its entirety.

FIG. 4 illustrates the expected extension in both the peak efficiency (y-Axis) and the lift at which the maximum efficiency occurs (x-Axis). Importantly, "Rotor Blade 2" provides improved maximum hover efficiency, which is desirable, but obtains this maximum hover efficiency at an increased lift value that may be too high to benefit efficient forward flight operation. In other words, the increased maximum hover efficiency permits an aircraft operational loading to a gross weight that is too great for efficient forward flight.

Applicant has determined that the rate of blade tip chord taper controls the gross weight at which hover efficiency improvements occur when hover optimized high lift airfoils are used at the blade tip region 44. Control of the rotor blade tip planform thereby allows the enhanced hover performance provided by the hover optimized high lift airfoils without conflict with the gross weight for efficient forward flight operation. That is, the tip planform preserves the optimized high lift airfoil efficiency gain, but aligns the gain at a lower and more practical rotor lift level to permit efficient forward flight operation.

Figure 5:
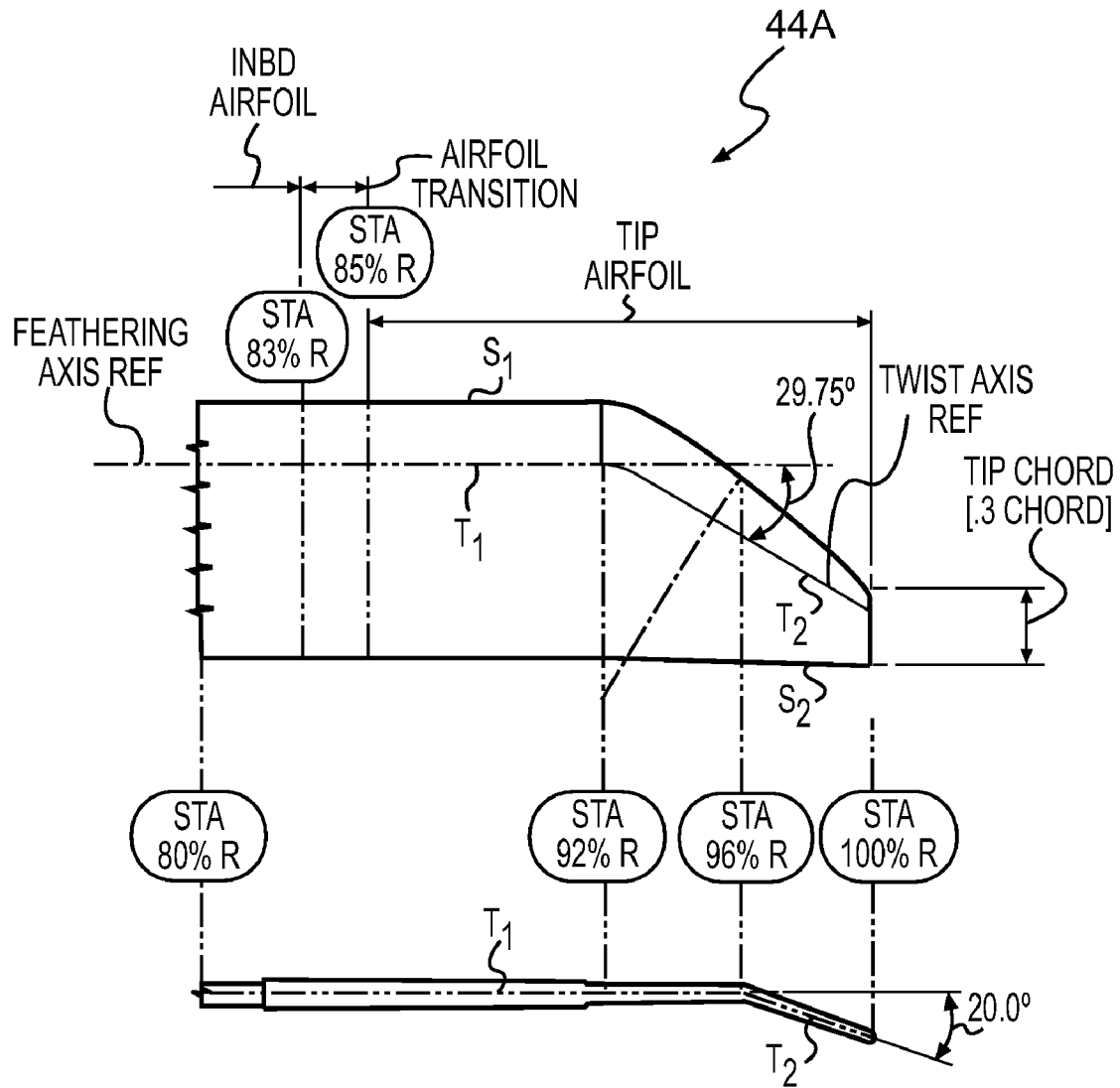
FIG. 5 is an expanded plan view of a rotor blade tip region shown without twist for clarity according to the present invention that includes the incorporation of taper, sweep, anhedral as well as the use of hover optimized airfoils.

Referring to FIG. 5, one tip region 44 planform which provides such benefits includes a tip taper that preferably commences at approximately 92% R and linearly reduces the chord at the tip ($C_{tip}$) to approximately 30 percent of the chord at 92% R ($C_{0.92\,R}$), or a tip chord ratio of $C_{tip}$:$C_{0.92\,R}$ of 0.30. Tip sweep also preferably commences at 92% R and reaches a preferred constant value of 29.75 degrees along the local quarter chord line of the tip region 44. The constant sweep of 29.75 degrees may be reached after a sweep transition radius along a portion of the blade length that preferably does not exceed approximately 1.5% of the blade span.

As shown, the tip region 44 preferably includes a first segment S1 which defines a first axis T1 and a second segment S2 which defines a second axis T2. The first axis T1 is preferably orientated parallel to the blade feathering axis P and the main region 42. It should be understood that the Figures are illustrated without a twist within the rotor blade 20 for sake of clarity and that the first axis T1 is generally oriented parallel to the longitudinal direction of the rotor blade 20 (FIG. 2). Preferably, approximately the outer 4% of the blade (second segment S2) is angled downward at an approximate 20 degree anhedral angle relative to the main region 42. That is, the second axis T2 is angled with respect to the first axis T1 to define an anhedral between the first segment S1 and the second segment S2 at the approximate 96% R station.

The combination of using a taper initiation point (at 92% R) and a tip chord taper ratio (of 0.30) define the amount of tip area reduction. Tip area reduction is necessary to tailor the lift at which the blade reaches maximum hover efficiency—thereby tuning the optimum designed operating state of the rotor. Test data and analyses were used to determine the best taper ratio and tip area reduction that were necessary over the outer 10% R of the blade span for use with the hover optimized tip airfoil that has high maximum lift coefficients at mach numbers of 0.5 and 0.6 used in the present invention. It was determined that a tip area reduction of approximately 28% over the outer 10% R blade span provided the optimal hover and forward flight performance solution.

It should be understood that any number of taper initiation radial locations and taper rates may be utilized to provide the approximate 28% or similar area reduction on the approximate outer 10% or similar span of blade in the tip region, and that additional criteria may influence the determination of the selected values. More specifically, it was mandated that the chord taper rate on the outer 4% span anhedral section should also not be so severe as to cause loss of hover performance and negate any efficiency benefits provided by the anhedral section. This was done by carefully addressing the induced impact of the position and strength of circulation trailed into the wake behind the rotor blade and understanding the impact of taper ratio and rate of taper at influencing these parameters. Moreover, the use of anhedral in combination requires further careful considerations of the amount of taper permitted so as not to neutralize additional improvements in hover efficiency enabled by the use of anhedral, and these elements are reflected in the design of the present invention.

The quarter chord tip sweep angle of 29.75 degrees is selected to limit the effective Mach number at the blade station experiencing peak lift in hover. A Mach number of 0.55 in hover was desired, since the hover optimized high lift airfoil 2-D maximum lift coefficient is optimized for the 0.50 to 0.60 Mach range. Generally, the effective aerodynamic Mach number at any radial blade station is the incident Mach number multiplied by the cosine of the local sweep angle. In hover then, the maximum local lift coefficient occurs at approximately 95% R were a local Mach number of 0.55 is obtained for a design tip Mach number of 0.662 when the local quarter chord sweep angle is 29.75 degrees.

Figure 6:
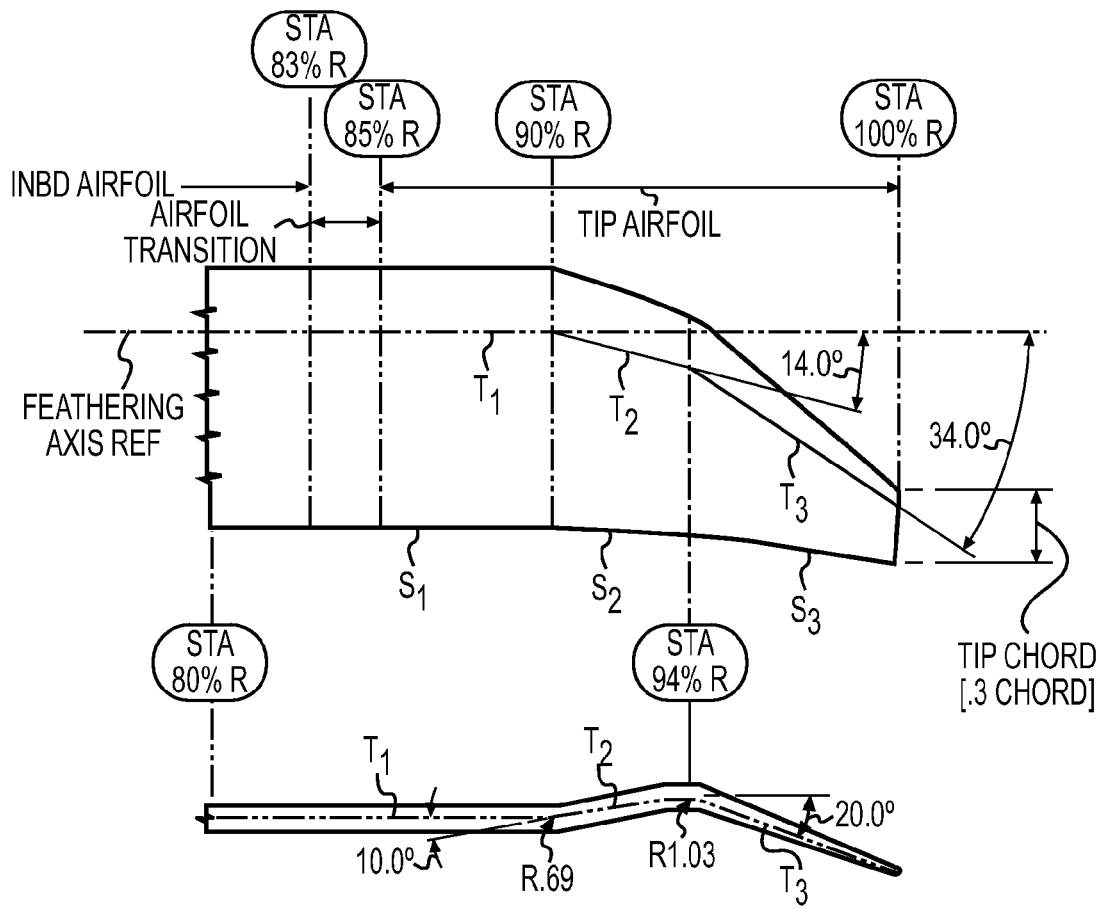
FIG. 6 is an expanded plan forward view of a rotor blade tip region shown without twist for clarity with a multi-sweep and multi-hedral section according to the present invention.

Referring to FIG. 6, another tip region 44B is disclosed. Tip region 44B as shown in FIG. 6 differs from tip region 44A as shown in FIG. 5 in at least two aspects. First, the anhedral displacement of tip region 44A is replaced by a multi-hedral blade tip section or compound 'cathedral' out-of-plane tip displacement having a dihedral section and an anhedral section. The "cathedral" joint preferably includes an approximate 10 degree upward displacement approximately between 90% R-94% R, followed by an approximate 20 degree negative displacement over approximately 94% R-100% R. That is, the tip region 44B includes a first segment S1 which defines a first axis T1, a second segment S2 which defines a second axis T2 and a third segment S3 which defines a third axis T3. The first axis T1 is preferably orientated parallel to the blade feathering axis P of the main region 42. The second axis T2 is angled with respect to the first axis T1 to define a dihedral between the first segment S1 and the second segment S2, preferably at the 90% R-94% R station. The third axis T3 is angled with respect to the second axis T2 to define an anhedral between the second segment S2 and the third segment S3, preferably at the 94% R station. Although a dihedral of approximately 10 degrees and an anhedral of approximately 20 degrees are disclosed in the illustrated embodiment, other angles will likewise benefit herefrom.

Second, the tip region 44B alters tip taper and sweep to compensate for cathedral impacts on tip lift. That is, replacing the anhedral only tip displacement of FIG. 5, with the compound cathedral displacement, reduces lift in the blade tip region. This then extends the rotor lift at which maximum hover efficiency is achieved in a manner similar to previously discussed airfoil improvements. Also, as with the use of hover optimized airfoils, the cathedral displacement impacts only hover, and not the rotor lift produced in forward flight. As a result, the hover lift/forward flight lift disconnect increases, thereby requiring an increase in the tip area reduction. This is accomplished in tip region 44B by moving the chord taper initiation inboard to approximately 90% R. That is, as shown, the constant 29.75 degree sweep beginning at 92% R of tip region 44A (FIG. 5) is replaced with a bi-swept shape beginning at approximately 90% R. The bi-swept shape preferably incorporates an inner 14 degree swept element between 90% R-94% R, followed by an outer 34 degree swept element that extends from 94% R-100% R. Preferably, the tip area reduction with chord taper also initiates at approximately 90% R rather than 92% R. Using a 14 degree sweep angle between the 90% R and 92% R stations prevents the trailing edge from moving forward prior to the 34 degree swept outer member.

It should be understood that various combinations of these tip characteristics may be utilized. Furthermore, continuously varying or multi-step piecewise distributions may also be utilized with the present invention as various radial segmentations of the blade tip region that include taper, sweep and dihedral/anhedral. Various sweep and dihedral/anhedral angles may also be utilized.

It should also be understood by one of ordinary skill in the art, the various blade characteristics disclosed herein may be utilized singularly or in any combination depending on the particular design requirements of the aircraft. Moreover, the invention has been generally described in connection with any rotary wing aircraft and the inventions are equally applicable to any aircraft including, but not limited to, single rotor helicopters, high-speed compound rotary wing aircraft, tilt-rotors, counter-rotating rotors and such like.

It should be understood that relative positional terms such as "forward," "aft," "upper," "lower," "above," "below," "inboard," "outboard," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor blade assembly for a rotary-wing aircraft comprising:
    a rotor blade main region having a main rotor blade chord; and
    a rotor blade tip region outboard of said rotor blade main region, said tip region having a tip chord and a tip taper, wherein the ratio of the main rotor blade chord to the tip chord is approximately 0.30 wherein said tip region includes a tip sweep that reaches a constant value of approximately 30 degrees along the quarter chord line.

2. The rotor blade assembly as recited in claim 1, wherein said tip taper commences at approximately 92% R.

3. The rotor blade assembly as recited in claim 1, wherein said tip taper linearly reduces the tip chord to a $C_{tip}:C_{0.92\ R}$ ratio of 0.30.

4. The rotor blade assembly as recited in claim 1, wherein said tip region includes a tip sweep that commences at approximately 92% R.

5. The rotor blade assembly as recited in claim 1, wherein said tip region includes a tip sweep that reaches a constant value of 29.75 degrees along the quarter chord line.

6. The rotor blade assembly as recited in claim 5, wherein said constant sweep of 29.75 degrees is reached after a sweep transition radius along a span the blade length that does not exceed approximately 1.5% of the blade span.

7. The rotor blade assembly as recited in claim 1, wherein said tip region includes a tip sweep that commences at approximately 92% R.

8. The rotor blade assembly as recited in claim 7, wherein said tip sweep reaches a constant value of approximately 29.75 degrees along the quarter chord line.

9. The rotor blade assembly as recited in claim 1, wherein said rotor blade main region defines a first axis, and said tip region defines a second axis, said second axis defining an anhedral relative to said first axis.

10. The rotor blade assembly as recited in claim 1, wherein said rotor blade main region defines a first axis, and said tip region defines a second axis, said second axis being angled with respect to said first axis at approximately 96% R.

11. The rotor blade assembly as recited in claim 1, wherein said tip region includes a hover optimized high lift airfoil section.

12. A rotor blade assembly for a rotary-wing aircraft comprising:

a rotor blade main region; and a rotor blade tip region outboard of said rotor blade main region, said tip region having a hover optimized high lift airfoil, a tip taper, and a tip sweep that reaches a constant value of approximately 30 degrees along the quarter chord line said tip taper linearly reduces the tip chord to a $C_{tip}:C_{0.92\ R}$ ratio of 0.30.

* * * * *

UNITED STATES PATENT AND TRADEMARK OFFICE
CERTIFICATE OF CORRECTION

PATENT NO. : 7,513,750 B2  Page 1 of 1
APPLICATION NO. : 11/370407
DATED : April 7, 2009
INVENTOR(S) : Moffitt et al.

It is certified that error appears in the above-identified patent and that said Letters Patent is hereby corrected as shown below:

Claim 1, Column 6, Line 65: Change "the" to "a"

Claim 12, Column 8, Line 17: Change "the" to "a"

Signed and Sealed this

Thirtieth Day of June, 2009

JOHN DOLL
*Acting Director of the United States Patent and Trademark Office*